Aug. 8, 1967     D. R. ROYER ET AL     3,334,753

FILTER ELEMENTS

Filed Sept. 21, 1964     2 Sheets-Sheet 1

INVENTORS
DAVID R. ROYER.
JOHN W. BOZEK

BY *Hauke & Hauke*

ATTORNEYS

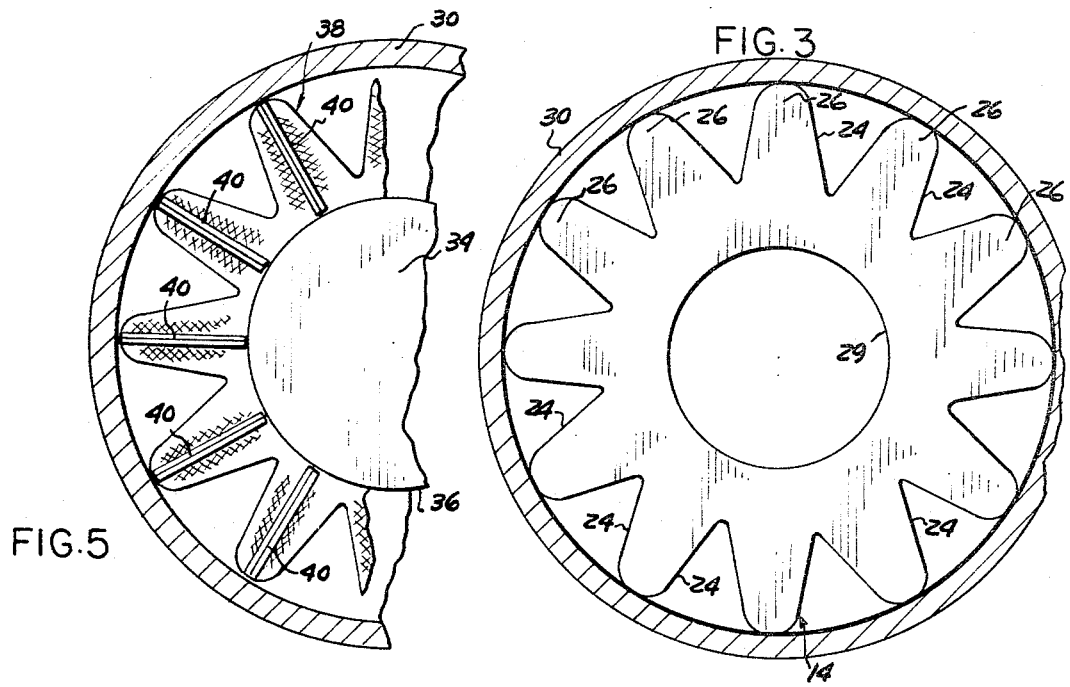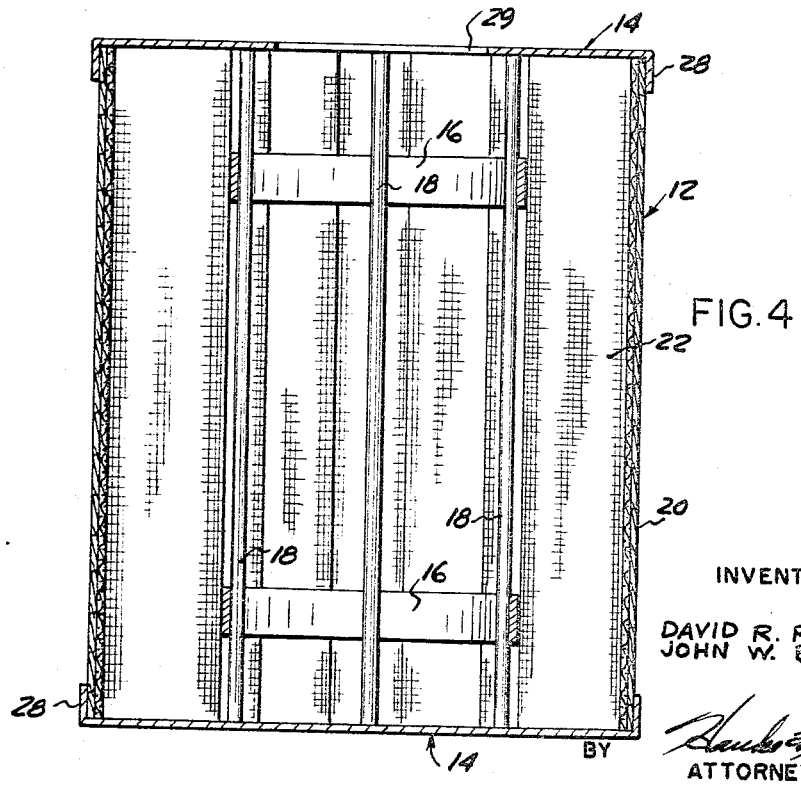

United States Patent Office 3,334,753
Patented Aug. 8, 1967

3,334,753
FILTER ELEMENTS
David R. Royer, Detroit, and John W. Bozek, Waterford, Mich., assignors to The Rosaen Filter Company, a corporation of Michigan
Filed Sept. 21, 1964, Ser. No. 397,930
6 Claims. (Cl. 210—457)

The present invention relates to fluid filtering systems and more particularly to an improved construction for pleated elements for such systems.

To increase the filtering area of any surface type filter elements to fit within a filter housing of a given size the filtering material may be pleated or corrugated. There are limitations however to the increase in the area which can be achieved in this manner. Increasing the number of pleats decreases the distance between the pleats and therefore increases the resistance offered to the passage of fluid through the filtering material. Increasing the depth of the pleats causes a corresponding increase in the difference between the inside and the outside circular dimensions of the elements. A decrease in the inside dimension tends to increase the resistance offered to the flow of the filter fluid through the interior of the element. In filter elements of heretofore known constructions the increase in the outside dimension tends to increase the resistance encountered by the unfiltered fluid as it flows through the annular space between the end caps of the element and the filter housing wall. When paper is used for the filtering media, crowding of the pleats leads to another reaction which also decreases the effective area of the filter element. As the walls of the pleats are forced closer to each other, the radial strength of the pleats becomes lower. An increase in the pressure differential due to an increase in the viscosity of the fluid or the dirt load on the element will tend to collapse the pleats and seal them against fluid flow.

The present invention is particularly applicable to filter elements of a paper construction. Means are provided to prevent the collapse of the individual pleats and to permit an increase in the depth of the pleats without an increase in the flow resistance of the filter element housing combination. To produce this result in the place of the usual single paper layer, a pleated paper wire double layer is used as the particle barrier. The openings in the wire are much bigger than the openings in the paper layer so that they form substantially no filtering function. The conventional perforated back-up cylinder of heretofore known filtering elements is replaced with a support cage consisting of two end caps, one or more radial reinforcing rings, and three or more longitudinal support members. The pleated paper wire double layer is formed around the support cage with the longitudinal joint and the ends of the filter element being sealed in the usual manner. In this way the collapse of the individual pleats is prevented by the pleated wire backup layer. Radial collapse of the completed element is prevented by the end caps and the reinforcing rings. Lengthwise distortion is prevented by the longitudinal support member. The pleated wire layer and support cage combination of the present invention thus resists all forms of distortion and because the conventional cylinder type back-up member has been eliminated the filter element of the present invention offers less flow resistance than conventionaal filter elements.

To permit an increase in the depth of the pleats two forms of the end cap construction are provided. In the first construction the end cap is formed with an outside diameter slightly larger than the outside circular dimension of the pleated cylinder. The diameter of the cap however is shaped to conform to the pleated or corrugated configuration of the paper-wire cylinder. This design provides end sealing of the pleats while providing fluid access to the depressions between the individual pleats. In another form the end cap is provided with a diameter substantially equal to the inside circular dimension of the paper-wire pleated cylinder. The pleats are allowed to project beyond the end caps. A short length of each pleat is collapsed at each end and sealed with a suitable adhesive or by some other suitable means. Again such a construction permits fluid access to the depressions formed intermediate the individual pleats.

It is an object then of the present invention to increase the effective area of surface type filter elements for a given size filter housing by providing a new construction for such elements utilizing a pleated filtering medium and end caps constructed to permit the outermost portions of the pleated filtering medium to extend closely adjacent the filter housing wall without interfering with fluid flow between the end cap of the element and the housing wall.

It is another object of the present invention to reduce the costs of manufacturing pleated filter elements by providing such an element comprising a pleated filter material wire double layer, and a support cage carrying the double layer and comprising one or more radial reinforcing rings, and three or more longitudinal support members secured thereto, and an end cap carried at each end of the support cage.

Still further objects and advantages of the present invention will readily occur to one skilled in the art to which the invention pertains upon reference to the following drawings in which like reference characters refer to like parts throughout the several views and in which FIG. 1 is a side elevational view of a preferred filter element of the present invention.

FIG. 3 is an end elevational view of the preferred element illustrated in FIGS. 1 and 2 and again showing the element installed in a filter housing.

FIG. 4 is a longitudinal cross-sectional view taken substantially on line 4—4 of FIG. 1, and FIG. 5 is a fragmentary cross-sectional view similar to FIG. 3 but illustrating another preferred embodiment of the present invention and looking in a direction opposite to that of FIG. 3.

Description

Figure 1:
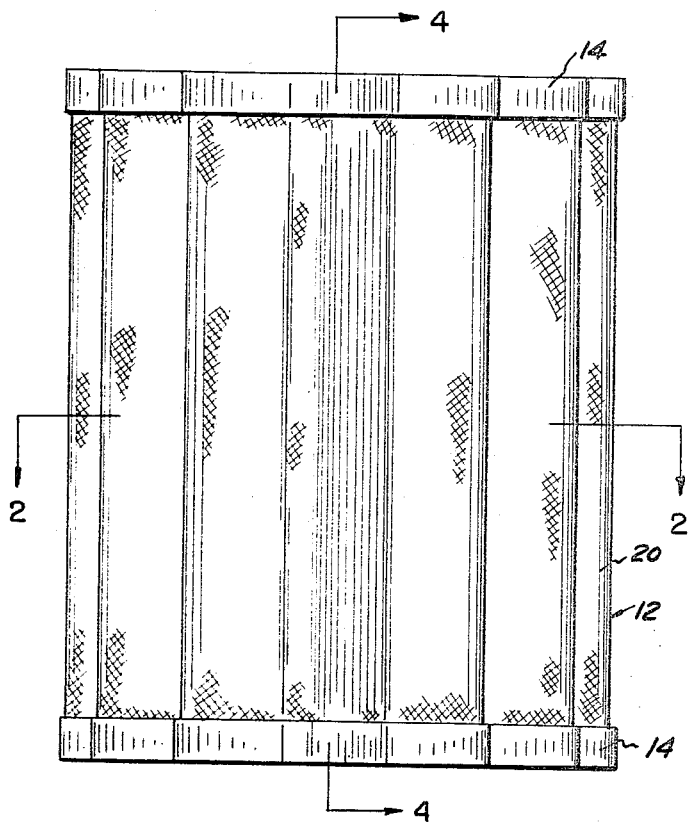

Now referring to the drawings for a more detailed description of the present invention a preferred filter element is illustrated in FIGS. 1–4 as comprising a support cage 10, a filtering member 12, and a pair of end caps 14.

Figure 2:
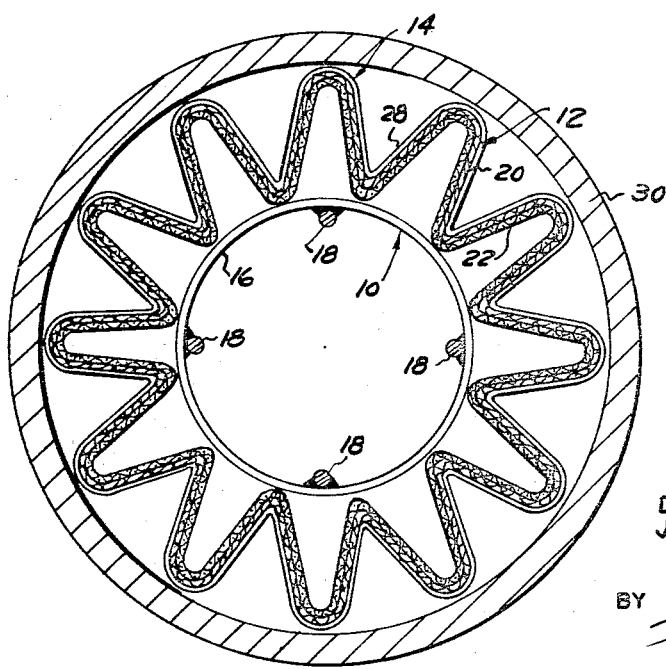
FIG. 2 is a cross-sectional view taken substantially on line 2—2 of FIG. 1 and illustrating the preferred filter element installed in a filter housing.

The support cage 10 as can best be seen in FIGS. 2 and 4 preferably comprises two or more substantially similar support rings 16 held in an axially spaced and axially aligned position by a plurality of elongated support rods 18. As illustrated the support rods 18 are preferably secured to the interior annular surface of the support rings 16 in any suitable manner such as welding and the like and are annularly spaced about the inner periphery of the support rings 16 in a substantially parallel position so that the support rings 16 are maintained in a fixed axially aligned position. In this manner the support cage 10 is substantially in the form of a hollow cylinder.

The filtering member 12 preferably comprises an outside layer of filtering material 20 such as paper or the like and an inside layer of a perforated or similar material 22 such as wire or the like. The perforated wire material 22 is preferably provided with openings much greater than the openings in the filtering material 20 so that the perforated material 22 performs no filtering function. The filtering material 20 and the perforated material 22 are preferably pleated or corrugated in the conventional manner except because of the support supplied by the perforated or wire material 22 the number of pleats can be substantially increased over those heretofore possible with a filter element of the same diameter. The pleated filtering material 20 and perforated material 22 double layer is then formed around the support cage 10 with the longitudinal joint sealed in the conventional manner.

The preferred end caps 14 illustrated in FIGS. 1–4 are formed with an outside diameter slightly larger than the outside circular dimensions of the pleated material 20 and 22 as can best be seen in FIGS. 2 and 4. The outer periphery of the end caps 14 is shaped as illustrated in FIG. 3 to conform to the pleated configuration of the pleated materials 20 and 22. Thus the end caps 14 are formed with a plurality of annularly spaced substantially V-shaped slots 24 which define a plurality of annularly spaced arcuate projections 26. The projections 26 are dimensioned substantially complementary to the individual pleats of the pleated materials 20 and 22 and the end caps 14 are provided with a peripheral flange portion 28 which is adapted to fit over the pleated materials 20 and 22 as best seen in FIGS. 2 and 4 to securely hold the filtering member 12 in place on the support cage 10. One of the end caps 14 is provided with an outlet opening 29.

It is apparent that the filter element illustrated in FIGS. 1–4 is of an inherently strong construction. The collapse of the individual pleats of the filtering member 12 is prevented by the pleated perforated or wire material 22. Radial collapse of the completed element is prevented by the end caps 14 and the support rings 16. Lengthwise distortion is prevented by the longitudinal support rods 18. Thus the particular construction of the present invention resists all forms of distortion to which a pleated filter element might be subjected during use. Further, the filter element illustrated in FIGS. 1–4 is constructed to provide a maximum filtering area for a filter housing of a given size. As illustrated in FIGS. 2 and 3 the outermost portions of the individual pleats of filtering member 12 can extend quite closely adjacent the inner periphery of a filter housing 30. This increase in the outside dimension of the filter element is permitted by the unique construction of the end caps 14. In filter elements of heretofore known construction the distance between the outside circular dimension of the filter element and the wall of the filter housing must be sufficient so as not to interfere with fluid flow between the filter element and the housing 30. By forming the end caps 14 with the projections 26 and slots 24 the outer periphery of the end caps 14 can extend closely adjacent the housing 30. The slots 24 provide sufficient room for the fluid to pass by the end caps 14 to reach the filtering member 12.

Not only does the present construction permit the outside circular dimension of the filter element to be increased for a given size filter housing but it also permits a decrease in the inside dimension of the filter element. In filter elements of heretofore known construction decreasing in the inside diameter of the filter element tends to increase the resistance offered to the flow of the filtered fluid element through the element since it produces a corresponding decrease in the diameter of the support cylinder commonly used in such filter elements. The present invention eliminates such support cylinders and since the inside area intermediate the pleats forms a portion of the flow path through the interior of the filter element a substantial decrease in the inside dimension can be provided without increasing flow resistance through the filter element.

FIG. 5 illustrates another preferred filter element utilizing a modified end cap construction. In place of the end caps 14 illustrated in FIGS. 1–4 end caps 34 are provided. In the preferred embodiment illustrated in FIG. 5 the end caps 34 are formed with a peripheral edge 36 having a diameter substantially equal to the circle formed by the innermost portions of the pleated filtering member 38. One of the end caps 34 like the end cap 14 is provided with an outlet opening 29 (not shown). The filtering member 38 is substantially similar in construction to the filtering member 12 described above except that the individual pleats of the filtering member 38 are allowed to project radially beyond the end caps 34 and a short length 40 of each pleat of the filtering member 38 is collapsed at each end and sealed with an adhesive, with metal clips which are clamped on the flattened pleat (not shown), or by some other suitable means. Thus again the particular construction of the end caps 34 and the filtering member 38 permit the outermost portions of the pleated filtering member 38 to extend closely adjacent the inner wall of the filter housing 30 since fluid may flow axially past the end cap 34 to the depressions between the individual pleats of the filtering member 38.

It is apparent that in each of the preferred embodiments illustrated and described a maximum filtering area has been achieved for a filter element of any size and which must be positioned within a housing of a given size. In increasing the number of pleats in the filtering members 12 and 38 and in increasing the depth of the pleats in these members, strength in the element has not been sacrificed. The increased effective area of the filter element is achieved without a corresponding increase in flow resistance through the filter element.

Although we have described but several embodiments of our invention it is apparent from the foregoing description that many changes and modifications can be made therein without departing from the spirit of the invention as expressed by the appended claims.

We claim:
1. A filter element comprising
   (a) a substantially cylindrical support member,
   (b) a substantially cylindrical filter member constructed to provide a plurality of circumferentially spaced radially extending pleats so that the outer edges of said pleats form an outside diameter of said filter element and radially innermost portions of said filter member form an inside diameter,
   (c) an end cap carried at each end of said support member and comprising an annular peripheral edge formed on a diameter substantially equal to the inside diameter forming said radially innermost portions of said filter member one of said end caps being provided with outlet means,
   (d) each of the pleats of said pleated filter member being sealed at each longitudinal end thereof with the sealed edges of said pleats extending radially beyond said end caps so that the spaces between adjacent pleats are open at each end of the filter element.

2. The combination as defined in claim 1 and in which said support member comprises
   (a) a pair of axially spaced ring members, and
   (b) a plurality of elongated support rods each secured to said ring members in a substantially parallel position to maintain said ring members in a substantially axially aligned position.

3. In combination, a filter housing having a substantially cylindrical chamber of a given fixed diameter, a filter element disposed within said chamber, said filter element comprising,
   (a) a substantially cylindrical support member,
   (b) a substantially cylindrical pleated filter member provided with a plurality of radially extending circumferentially spaced pleats, said filter member carried by said support member and having radially outermost portions formed on a diameter substantially equal to the diameter of said filter housing chamber and radially innermost portions formed on an inside diameter,
   (c) an end cap carried at each end of said support member and comprising an outer peripheral annular edge formed on a diameter substantially equal to the inside diameter forming said radially innermost portions of said filter member one of said end caps being provided with an outlet means, (d) said pleats of said pleated filter member extending radially beyond the outer periphery of said end caps and being sealed at each longitudinal end thereof so that the spaces between adjacent pleats are open at their ends to said chamber.

4. The combination as defined in claim 3 and in which said support member comprises
(a) a pair of axially spaced ring members and
(b) a plurality of elongated support rods secured to said ring members in a substantially parallel position to maintain said ring members in a substantially axially aligned position.

5. A filter element comprising:
(a) a substantially cylindrical filter member having portions formed on an inside diameter and constructed to provide a plurality of circumferentially spaced radially extending pleats the radially outermost edges of which form an outside diameter of said member,
(b) an end cap carried at each end of said filter member with one of said end caps being provided with outlet means,
(c) each of said end caps comprising an outer peripheral annular edge formed on a diameter substantially equal to the inside diameter forming said first mentioned portions of said filter member,
(d) each of the pleats of said pleated filter member extending radially outwardly from said annular edge of said end caps to define a plurality of radially extending ends at each longitudinal end of said filter member, said ends being sealed so that the spaces between adjacent pleats are open at each end.

6. A filter element as defined in claim 5 and in which said filter element further comprises;
(a) a substantially cylindrical support cage carrying said filter member,
(b) said support cage comprising a pair of axially spaced ring members and a plurality of elongated support members secured to said ring members to maintain said ring members in a substantially axially aligned position.

References Cited
UNITED STATES PATENTS

| | | | |
|---|---|---|---|
| 934,076 | 9/1909 | Kneuper | 210—457 |
| 2,189,704 | 2/1940 | Campbell | 210—493 X |
| 2,239,868 | 4/1941 | Williams | 210—493 X |
| 2,738,879 | 3/1956 | Frantz | 210—487 X |
| 2,962,121 | 11/1960 | Wilber | 210—493 X |
| 3,092,577 | 6/1963 | Sather | 210—484 X |
| 3,096,281 | 7/1963 | Smith et al. | 210—493 X |
| 3,160,488 | 12/1964 | Wilber | 210—493 X |
| 3,189,179 | 6/1965 | McMichael | 210—493 X |

REUBEN FRIEDMAN, *Primary Examiner.*

C. DITLOW, *Examiner.*